United States Patent [19]

Hasegawa et al.

[11] Patent Number: 4,972,740
[45] Date of Patent: Nov. 27, 1990

[54] HYDRAULIC CONTROL CIRCUIT FOR AUTOMATIC TRANSMISSION

[75] Inventors: Hiromi Hasegawa; Toshiaki Ishiguro, both of Aichi, Japan

[73] Assignee: Aisin Seiki Kabushiki Kaisha, Kariya, Japan

[21] Appl. No.: 390,717

[22] Filed: Aug. 8, 1989

Related U.S. Application Data

[62] Division of Ser. No. 102,393, Sep. 29, 1987, Pat. No. 4,870,877.

[30] Foreign Application Priority Data

Sep. 30, 1986 [JP] Japan .................. 61-231552
Sep. 30, 1986 [JP] Japan .................. 61-231553
Sep. 30, 1986 [JP] Japan .................. 61-231554

[51] Int. Cl.$^5$ ............................................ B60K 41/06
[52] U.S. Cl. ................................................. 74/869
[58] Field of Search ...................... 74/867, 868, 869

[56] References Cited

U.S. PATENT DOCUMENTS

| | | | |
|---|---|---|---|
| 4,468,987 | 9/1984 | Miller | 74/869 X |
| 4,567,791 | 2/1986 | Sato | 74/867 X |
| 4,727,773 | 3/1988 | Sumiya et al. | 74/867 |
| 4,776,240 | 10/1988 | Miki | 74/869 |
| 4,827,806 | 5/1989 | Long et al. | 74/869 |

Primary Examiner—Dwight Diehl
Attorney, Agent, or Firm—Burns, Doane, Swecker & Mathis

[57] ABSTRACT

A hydraulic control circuit for an automatic transmission of at least 5 forward gear shift stages, which comprises:
  a first solenoid valve connected to each spool controlling hydraulic line pressure passage of a 1-2 shift valve and a 3-4 shift valve; and
  a second solenoid valve connected to a spool controlling hydraulic line pressure passage of a 4-5 shift valve;
  a third solenoid valve connected to a spool controlling hydraulic line pressure passage of at least 2-3 shift valve
  wherein each of said gear shift stages is established based on combination of ON-OFF operation of each of said solenoid valves.

An inhibitor valve the valve is operative by any one of said first and second solenoid valves, and simultaneously establishing an inhibitor for solenoid valve disconnection and inhibitor for manual shift down operation. A manual range pressure at "3" or "2" is supplied to each friction member via at least two shift valves.

6 Claims, 5 Drawing Sheets

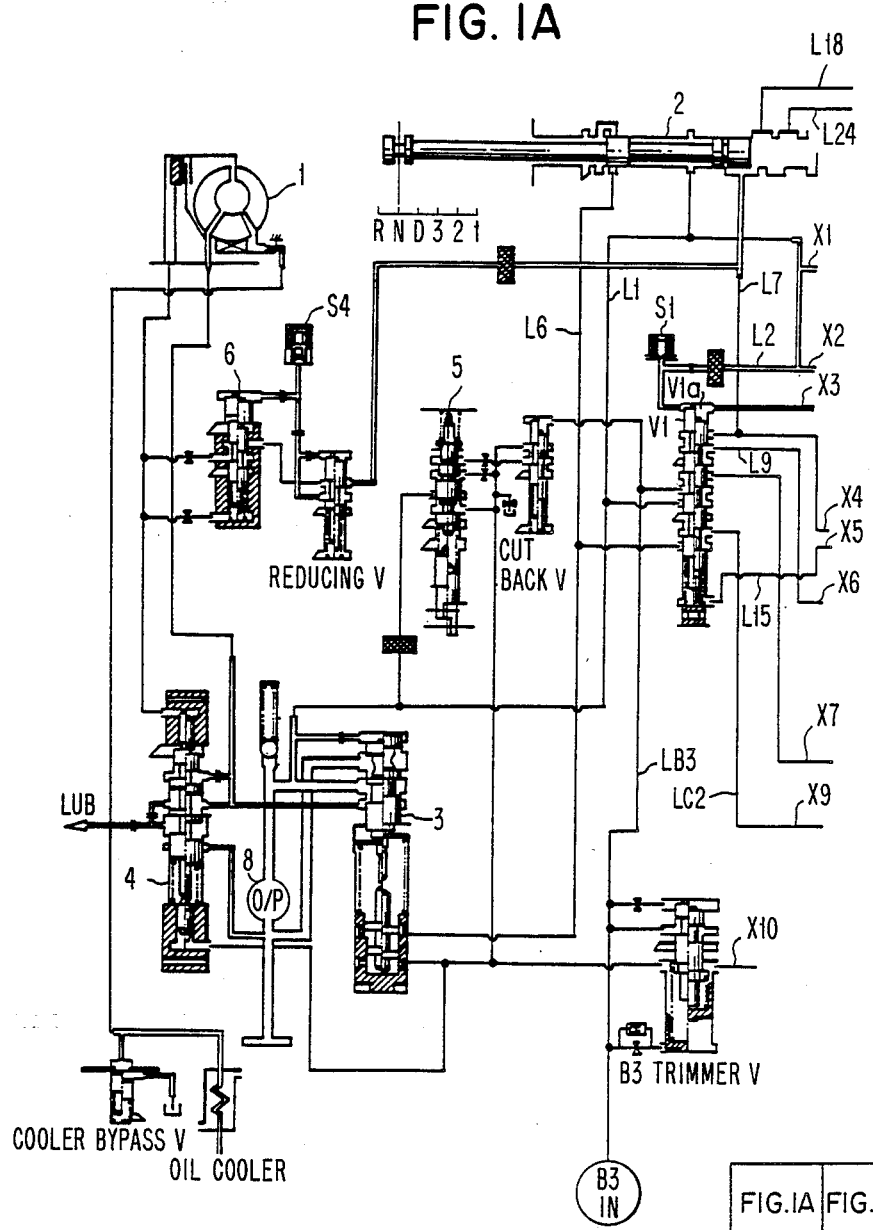
FIG. IA
FIG. I

HYDRAULIC CONTROL CIRCUIT FOR AUTOMATIC TRANSMISSION

RELATED APPLICATIONS

The present application is a divisional application of pending application Ser. No. 07/102,393, filed on Sept. 29, 1987, of Hiromi Hasegawa and Toshiaki Ishiguro for Hydraulic Control Circuit For Automatic Transmission.

BACKGROUND

The present invention relates to a hydraulic control circuit for an automatic transmission with 5 or more forward gear change ratios (shift stages) and more specifically to a hydraulic control circuit including an inhibitor circuit for an automatic transmission.

With respect to a first aspect of the present invention, in a conventional hydraulic control circuit for an automatic transmission with plural gear change ratios, the construction has been such that a shift valve and control solenoid valve are provided for each friction engaging member (referred to as "friction member").

Therefore, in an automatic transmission with multiple gear change ratios such as 5 or more forward gear shift stages; for instance, in a 6-forward-stage automatic transmission provided with 6 friction members of 3 clutches (C1 to C3) and 3 brakes (B1 to B3) and five shift valves (1-2 shift valve, 2-3 shift valve, 3-4 shift valve, 4-5 shift valve, and 5-6 shift valve), a solenoid valve is required for each shift valve to control each shift valve, and therefore the number of solenoid valves increases with increasing shift stages.

In a multiple gear change ratio automatic transmission of 5 or 6 forward gear shift stages, in particular, an increase in the number of the solenoid valves results in an increase in the cost and the space within which these solenoid valves are installed, thus increasing the volume of the automatic transmission.

Further, in the conventional automatic transmission, since a single shift valve is controlled by a single solenoid valve to constitute each gear shift stage as already described, in case the solenoid valve is abnormal, there exists a problem in that the friction members are engaged in duplicate fashion into and out-of-control and the transmission is damaged due to shock generated when the friction members are engaged duplicate.

With respect to a second aspect of the present invention, in the hydraulic control circuit for an automatic transmission with 5 or more forward gear change ratios, the same friction member is used separately at two different gear shift stages, for instance at the 3 and 5 gear shift stages or the 2 and 6 gear shift stages.

This indicates that hydraulic pressure should be supplied to the same friction member via two different hydraulic passages. Therefore, conventionally change balls are used as change over valves for changing over hydraulic supply passages communicating with the same friction member used separately at two different gear shift stages.

In these change balls, a ball is disposed at a ball seat and hydraulic supply is changed over when the ball is brought into contact with or separated from the ball seat. However, since the ball is readily vibrated on the ball seat whenever hydraulic pressure is introduced or discharged, when used for a long time, the seating tightness between the ball and the seat is degraded, thus raising a problem with durability. The poor durability of the change ball is a serious problem in particular, for trucks which require a long life. Further, there exists another problem such that the change ball is not uniform in quality and therefore poor in reliability.

With respect to a third aspect of the present invention, in the conventional hydraulic control circuits for an automatic transmission, there exist ones provided with a so-called fail-safe function which enables manual travelling in case of solenoid valve disconnection and with an inhibitor function which prevents engine overrun in case of manual gear shift down during high speed travelling.

In the conventional hydraulic control circuit for an automatic transmission, however, there exist some gear shift stages at which the inhibitor function (, i.e., the fail-safe function) is disabled in case of disconnection of the solenoid valve. In other words, in the conventional automatic transmission, there exists a fear such that the engine goes into over-run in case of manual shift down at a high speed.

SUMMARY OF THE DISCLOSURE

According to a first aspect of the present invention, it is an object of the present invention to provide a hydraulic control circuit for an automatic transmission which can solve the drawbacks of the conventional automatic transmission related to the first aspect, that is, which can reduce the number of solenoid valves in an automatic transmission of multiple gear change ratios with 5 or more forward ratios, as compared with the conventional transmission and further enables manual shift change travelling even when the solenoid valve malfunctions.

According to a second aspect of the present invention, it is an object of the present invention to provide a hydraulic control circuit for an automatic transmission which can solve the drawbacks of the conventional automatic transmission related to the second aspect, that is, which can eliminate the use of the change balls to improve the durability and reliability in an automatic transmission with 5 or more multiple gear change ratios.

According to a third aspect of the present invention, it is an object of the present invention to provide a hydraulic control circuit for an automatic transmission which can solve the drawbacks of the conventional automatic transmission related to the third aspect, that is, which enables safe travelling by securing both an inhibitor circuit and a fail-safe circuit together at a high-speed gear shift stage.

The other objects of the present invention will become apparent in the entire disclosure of the present invention.

According to the first aspect of the present invention, in order to achieve the object of the first aspect, the hydraulic control circuit for an automatic transmission with at least 5 forward gear change ratios is characterized in that there are provided a first solenoid valve connected to each spool controlling hydraulic line pressure passage of a 1-2 shift valve and a 3-4 shift valve, a second solenoid valve connected to a spool controlling hydraulic line pressure passage of a 4-5 shift valve, and a third solenoid valve connected to a spool controlling hydraulic line pressure passage of at least a 2-3 shift valve, wherein each gear change stage is established based on a combination of on-off operations of each solenoid valve. In a 6 forward-stage hydraulic control circuit, in particular, the circuit is further characterized in that the third solenoid valve is connected to each spool controlling hydraulic line pressure passage of the 2-3 shift valve and a 5-6 shift valve.

In the hydraulic control circuit of the first aspect of the present invention, the connection (or application) of each spool controlling line pressure to the 1-2 shift valve and 3-4 shift valve is controlled by on-off operations of the first solenoid valve; the connection of the spool controlling line pressure to the 4-5 shift valve is controlled by on-off operations of the second solenoid valve. With respect to the connection of each spool controlling line pressure to at least the 2-3 shift valve in a 6 forward stage hydraulic control circuit, in particular, the connection of each spool controlling line pressure to the 2-3 shift valve and the 5-6 shift valve is controlled by on-off operations of the third solenoid valve. That is, the friction members are selectively engaged on the basis of a combination of on-off operations of the solenoid valve which controls two shift valves simultaneously, thus each gear shift stage of the automatic transmission with at least 5 forward gear change ratios being established.

According to the second aspect of the present invention, in order to achieve the object of the second aspect, the hydraulic control circuit for an automatic transmission with at least 5 forward gear shift ratios is characterized in that a manual range pressure at each gear shift stage is supplied to each friction member via 2 or more shift valves.

According to the second aspect of the present invention, a manual range pressure at each gear shift stage is supplied to each friction member via at least 2 or more shift valves; one shift valve takes part in shifting a gear change ratio and the other shift valve serves as a valve for changing over hydraulic pressure supply from a plurality of passages to one friction member to which hydraulic pressure is supplied. Therefore, in the automatic transmission having at least 5 forward gear change ratios, it is possible to eliminate the use of change balls, thus improving the durability and reliability thereof.

According to the third aspect of the present invention, in order to achieve the third aspect, the hydraulic control circuit is characterized in that there are provided a first solenoid valve connected to each spool controlling hydraulic line passage of a 1-2 shift valve and a 3-4 shift valve, a second solenoid valve connected to a spool controlling hydraulic line passage of a 4-5 shift valve, and a third solenoid valve connected to a spool controlling hydraulic line pressure passage of at least a 2-3 shift valve in order to establish each gear shift stage on the basis of a combination of on-off operations of each solenoid valve; and further an inhibitor (hydraulic pressure control valve) actuated by any one of the solenoid valves is connected to the above hydraulic control circuit so as to establish an inhibitor (and fail-safe) effective in case of solenoid valve malfunction (e.g., solenoid disconnection) and, simultaneously, an inhibitor effective in case of manual shift down.

In the hydraulic control circuit of the present invention, the connection of each spool controlling line pressure to the 1-2 shift valve and the 3-4 shift valve is controlled by on-off operations of the first solenoid valve; the connection of the spool controlling line pressure to the 4-5 shift valve is controlled by on-off operations of the second solenoid valve; and the connection of each spool controlling line pressure to at least the 2-3 shift valve is controlled by on-off operations of the third solenoid valve. The friction member is selectively engaged on the basis of the on-off combination of the solenoid valves which control the two shift valves simultaneously to establish each gear shift stage of the automatic transmission. Further, at each gear shift stage, an inhibitor valve connected to the hydraulic control circuit establishes both an inhibitor at solenoid valve disconnection so that manual shift change travelling (i.e., fail-safe) is enabled and simultaneously an inhibitor against manual shift down operation is established to prevent engine over-run, thus realizing a safe drive of an automatic vehicle.

BRIEF DESCRIPTION OF THE DRAWINGS

FIG. 1 shows the relationship between FIGS. 1A and 1B

FIG. 1A is a portion of a hydraulic control circuit diagram showing an embodiment according to one aspect of the present invention;

DESCRIPTION OF THE PREFERRED EMBODIMENTS

Figure 1B:
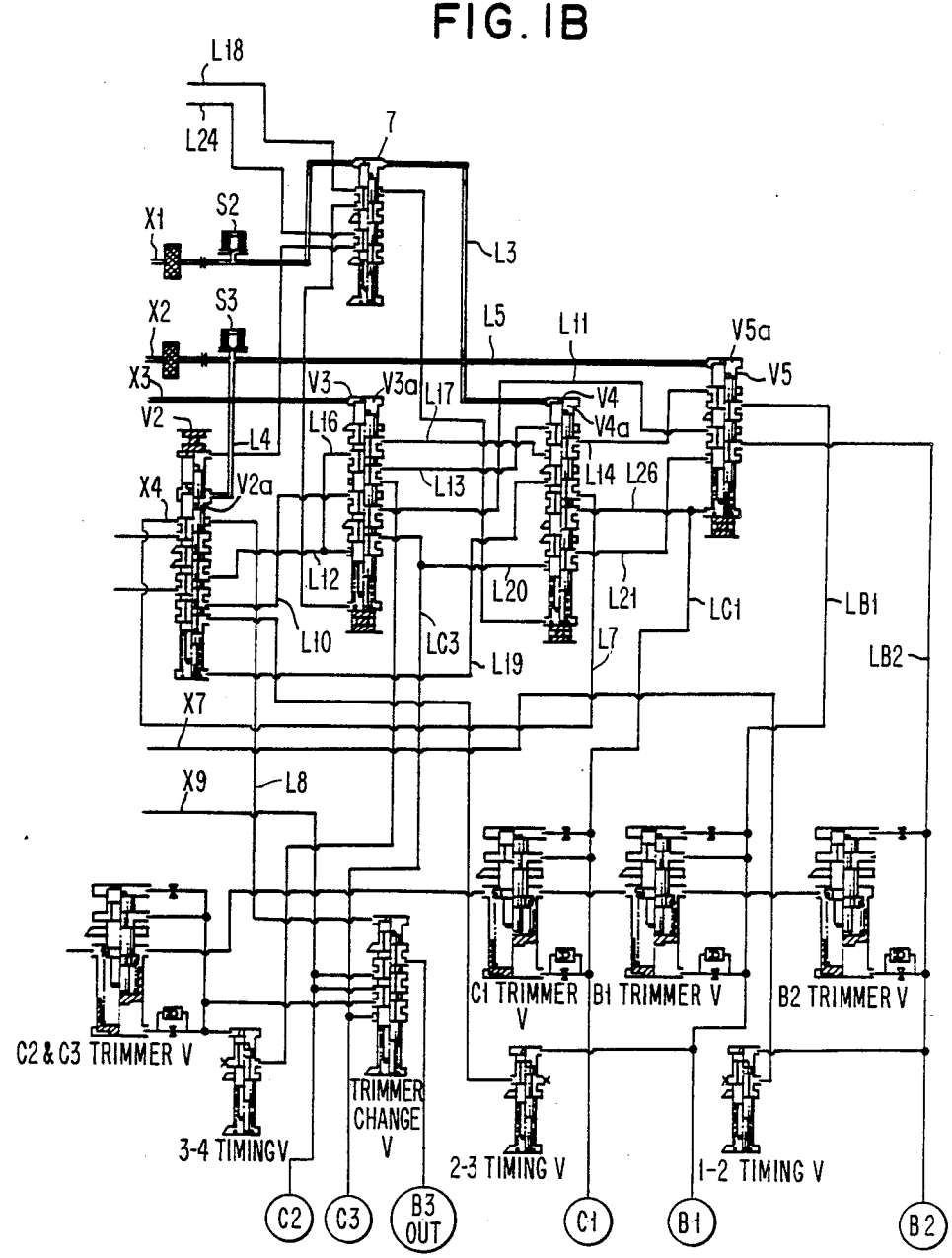
FIG. 1B shows a portion of a hydraulic control circuit for a 6 forward stage automatic transmission to which the present invention is applied.

With respect to the third aspect of the present invention, the conventional method and the related drawbacks will first be described in detail.

TABLE 1

| range | ratio | S 1 | S 2 |
|---|---|---|---|
| D | 4th | X | X |
|   | 3rd | X | O |
|   | 2nd | O | O |
|   | 1st | O | X |
| 2 | (3rd) | X | X |
|   | 2nd | O | O |
|   | 1st | O | X |

O - ON
X - OFF

In an automatic transmission with 4 forward gear change ratios which constitutes each gear shift stage by on-off operations of two solenoid valves S1 and S2 as listed in Table 1 above, when the 2nd or 4th gear shift position is manually shifted down to the 2nd position in the Drive range, since the engine goes into over-run if quickly shifted down to the 2nd position, the solenoid valves S1 and S2 are kept at the 4th position until the vehicle speed drops below a predetermined value (inhibitor function in manual shift down).

Further, in the above automatic transmission, when disconnection occurs in the solenoid valve S1 or S2, manual shift drive is enabled at 4th, 3rd or 1st position in the D range and at the 1st position in "2" range, as understood in Table 1. Further, when the two solenoid valves S1 and S2 are both disconnected, manual shift drive is enabled at the 3rd position.

In the conventional hydraulic control circuit for an automatic transmission, however, since fail-safe is established in the case of solenoid valve disconnection as already explained, there exists a gear shift stage at which no inhibitor is established.

In the automatic transmission actuated as shown in Table 1, for instance, although it is possible to establish an inhibitor between the 4th and 2nd positions or between 3rd and 2nd positions, it has been impossible to establish an inhibitor between the 4th and 3rd positions.

This is because as already explained when the solenoid valves S1 and S2 are disconnected in the "2" range, fail-safe is established so that manual shift drive is enabled at the 3rd position, and therefore the condition at the 4th position in the D range established when both the solenoid valves S1 and S2 are off is the same as that at the 3rd position in the 2 range established when both the valves S1 and S2 are disconnected, so that when the 4th position in the D range is manually shifted down to the "2" range, the shift position is automatically set to the 3rd position.

In the conventional automatic transmission, therefore, there exists a likelyhood such that the engine goes into over-run in the case of manual shift down at high speed. The abovementioned drawbacks can be solved by the third aspect of the present invention.

The present invention will be described in detail on the basis of embodiments shown in the drawings.

Figure 2:
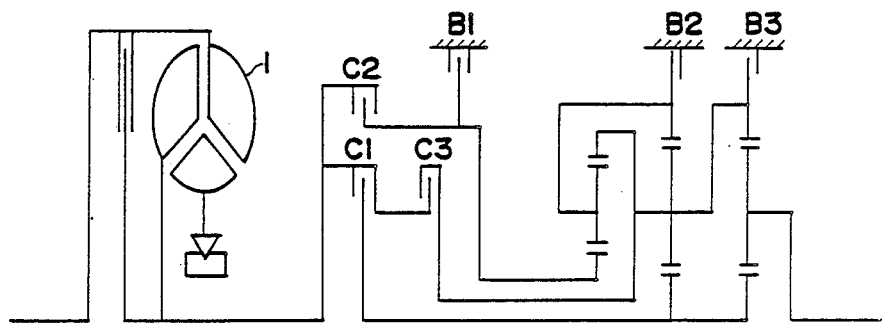
FIG. 2 is a skelton diagram showing an embodiment of a gear train of the automatic transmission actuated by the hydraulic control circuit shown in FIG. 1.
Figures 3, 3A:
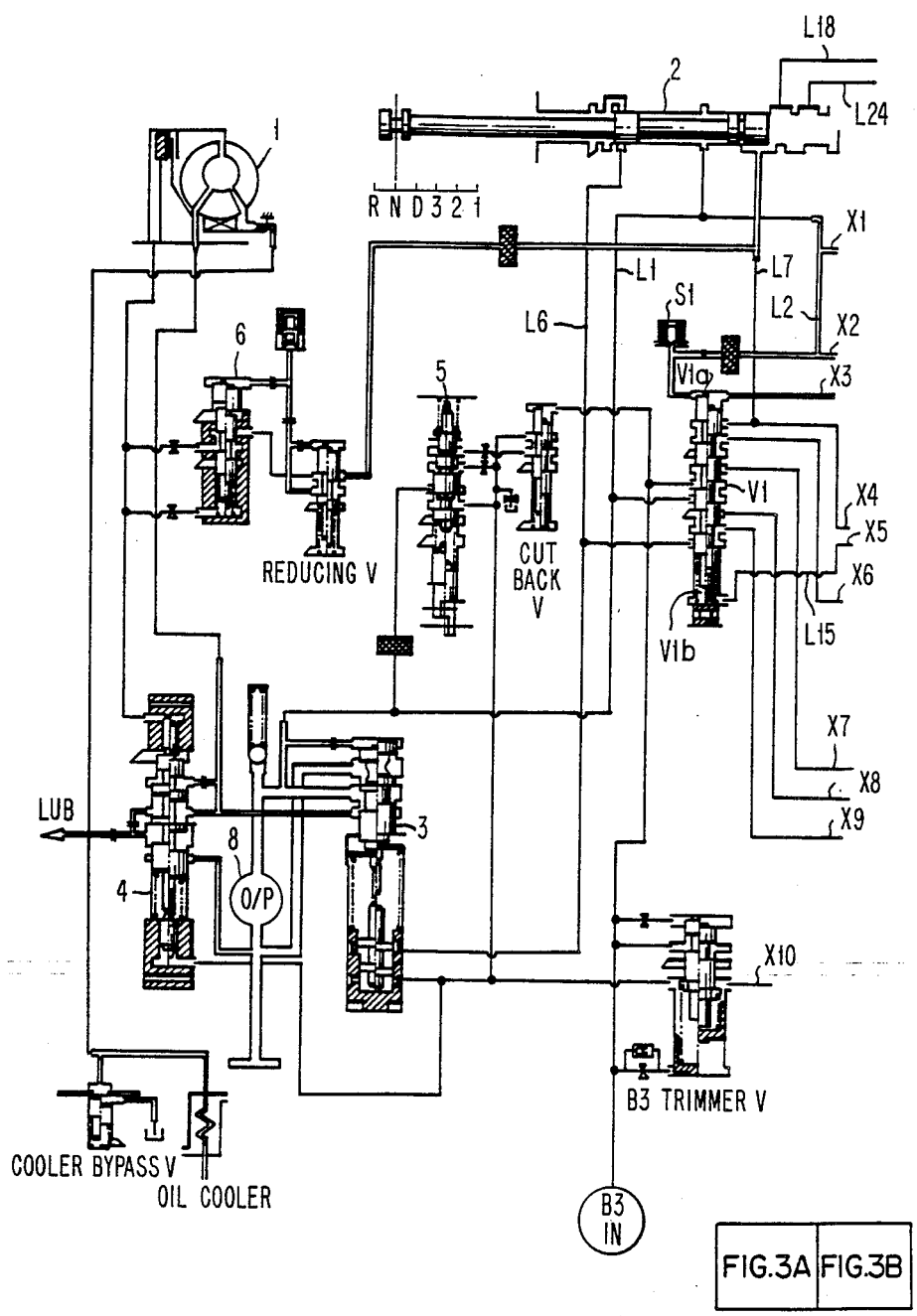
FIG. 3 shows the relationship between FIGS. 3A and 3B
FIG. 3A is a portion of another hydraulic control circuit diagram showing an embodiment according to another aspect of the present invention.
Figure 3B:
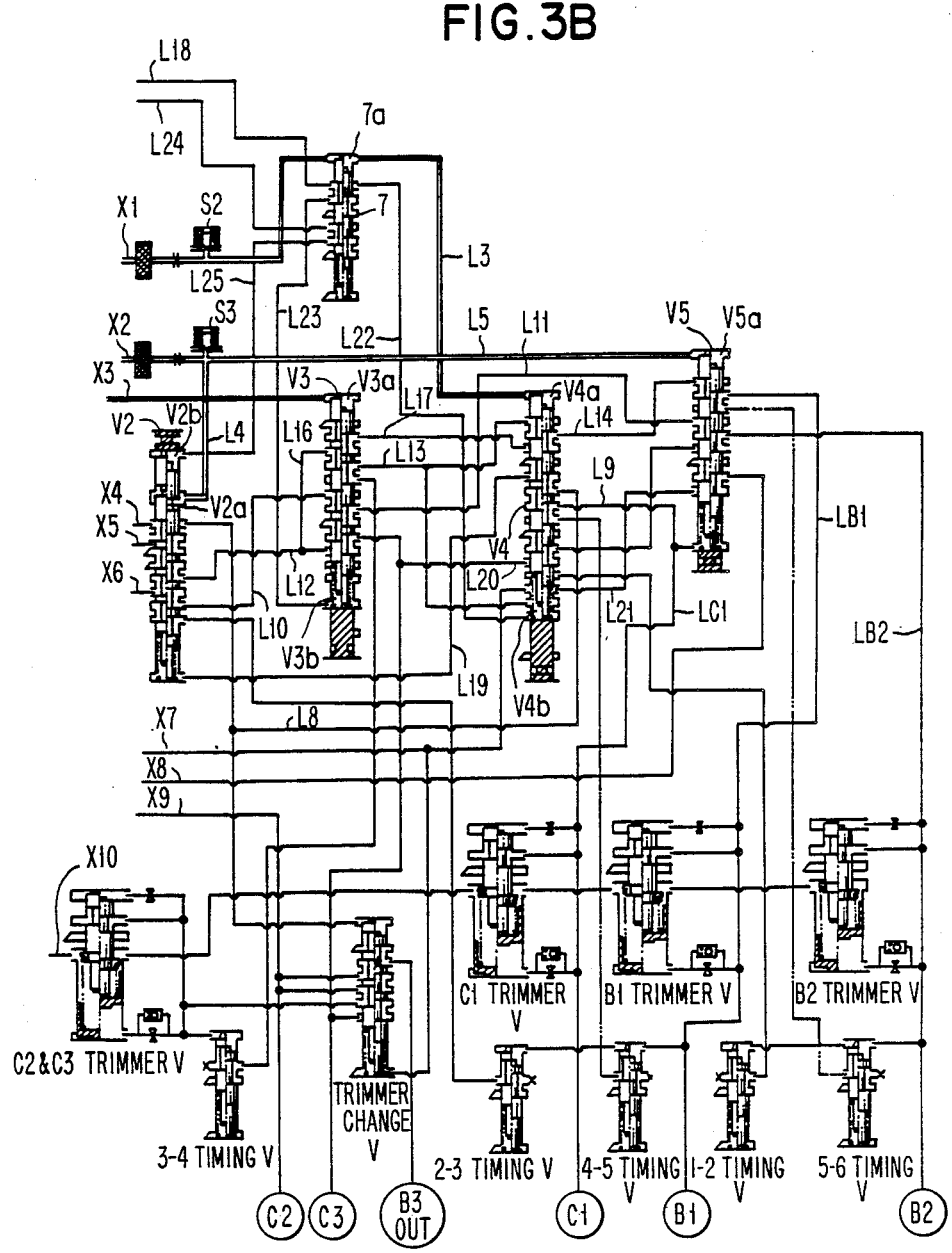
FIG. 3B is a portion of another hydraulic control circuit diagram showing an embodiment according to another aspect of the present invention.

FIGS. 1A and 1B show a hydraulic control circuit for a 6 forward stage automatic transmission to which the present invention is applied;

FIG. 2 shows a gear train of the automatic transmission controlled by the hydraulic control circuit shown in FIG. 1; and FIGS. 3A and 3B show an embodiment based upon the third aspect of the present invention.

With reference to FIGS. 1A and 1B the configuration of the hydraulic control circuit will be explained. The reference numeral 1 denotes a torque converter; 2 denotes a manual valve; 3 denotes a primary regulator valve; 4 denotes a secondary regulater valve; 5 denotes a throttle valve; 6 denotes a lock-up control valve; 7 denotes an inhibitor valve; 8 denotes an oil pump; V1 denotes a 1-2 shift valve; V2 denotes a 2-3 shift valve; V3 denotes a 3-4 shift valve; V4 denotes a 4-5 shift valve; V5 denotes a 5-6 shift valve; S1 to S3 denote solenoid valves; and S4 denotes a lock-up controlling duty solenoid valve.

The solenoid valve S1 (the first solenoid valve) is of normally closed (NC) type and connected to a hydraulic passage L2 communicating a line pressure hydraulic passage L1 from the oil pump 8 to a spool controlling hydraulic chamber V1a of the 1-2 shift valve V1. This hydraulic chamber V1a of the 1-2 shift valve communicates with a spool controlling hydraulic chamber V3a of the 3-4 shift valve V3.

The solenoid valve S2 (the second solenoid valve) is of normally open (NO) type and connected to a hydraulic passage L3 communicating between the line pressure hydraulic passage L1 and a spool controlling hydraulic chamber V4a of the 4-5 shift valve V4 via the inhibitor valve 7.

The solenoid valve S3 (the third solenoid valve) is of normally open (NO) type and connected to hydraulic passages L4 and L5 communicating the line pressure hydraulic passage L1 with a spool controlling hydraulic chamber V2a of the 2-3 shift valve V2, and a spool controlling hydraulic chamber V5a of the 5-6 shift valve V5, respectively.

Table 2 below indicates the operations of the solenoid valves S1 to S3 and the shift valves V1 to V5 at each gear shift stage in the hydraulic control shown in FIG. 3 and the operation of clutches C1 to C3 and brakes 81 to 83 at each gear shift stage in the gear train shown in FIG. 2.

TABLE 2

| | solenoid values | | | shift value direction | | | | | Friction members | | | | | |
|---|---|---|---|---|---|---|---|---|---|---|---|---|---|---|
| | S1 | S2 | S3 | V1 | V2 | V3 | V4 | V5 | C1 | C2 | C3 | B1 | B2 | B3 |
| Rev. | X | X | X | ↓ | ↑ | ↓ | ↑ | ↑ | | O | | | | O |
| N | X | X | X | ↓ | ↑ | ↓ | ↑ | ↑ | | | | | | O |
| 1st | X | X | O | ↓ | ↓ | ↓ | ↑ | ↑ | O | | | | | O |
| 2nd | O | X | O | ↑ | ↓ | ↓ | ↑ | ↑ | O | | | | O | |
| 3rd | O | X | X | ↑ | ↑ | ↓ | ↑ | ↑ | O | | O | | | |
| 4th | X | X | X | ↑ | ↑ | ↓ | ↑ | ↑ | O | O | | | | |
| 5th | X | O | X | ↑ | ↑ | ↓ | ↓ | ↑ | | O | O | | | |
| 6th | X | O | O | ↑ | ↑ | ↓ | ↓ | ↓ | | O | | | O | |

(NC) (NO) (NO)

With reference to TAble 2, in the reverse (Rev.) stage, the solenoid valves S1 to S3 are all off. Therefore, only the solenoid valve S1 is closed, hydraulic pressure is introduced into the hydraulic chamber V1a of the 1-2 shift valve V1 and the hydraulic chamber V3a of the 3-4 shift valve V3 via the line pressure hydraulic passage L1 in order to slide each spool downward in FIGS. 1A and 1B, while the spools of the other shift valves are positioned at the upward position in FIGS. 1A and 1B.

Therefore, line pressure is introduced from the line pressure hydraulic passage L1 to the hydraulic passage LB3 of the brake member (3 via the 1-2 shift valve V1. Further, a Rev.-range pressure (passage L6) from the manual valve 2 is introduced into the hydraulic passage LC2 of the clutch member C2 via the 1-2 shift valve V1 to engage the clutch C2 and the brake 83, thus Rev. conditions being established.

In neutral stage (N), although the solenoid valves S1 to S3 are off and each shift valves V1 to V5 are at the same condition as in Rev. stage, since no Rev.-range pressure is generated, only the brake 83 is engaged, thus N conditions being established.

In the 1st gear shift stage (1st), only the solenoid valve S3 is on; therefore, the solenoid valves S1 and S3 are closed.

Since the line pressure is introduced in to the hydraulic chamber V2a of the 2-3 shift valve V2 via the solenoid valve S3, the spool of the 2-3 shift valve V2 is positioned at a downward position in FIGS. 1A and 1B, in addition to the Rev. or N condition.

In addition to the engagement of the brake 83, a D-range pressure (or 3-range pressure, 2-range pressure, 1-range pressure, referred to as "D-range pressure", hereinafter) from the manual (shift) valve 2 is introduced into the hydraulic passage LC1 of the clutch C1 by way of a passage L7, the 4-5 shift valve V4, and a passage L27L26 to engage the clutch C1, thus 1st stage condition being established.

Further, although a hydraulic pressure is introduced into the hydraulic chamber V5a of the 5-6 shift valve V5 because the solenoid valve S3 is ON, its spool is urged to the upward position in FIGS. 1A and 1B by the D-range pressure from the passage L26 and its spring.

In the 2nd gear shift stage (2nd), the solenoid valves S1 and S3 are ON and only the solenoid valve S3 is closed. As compared with the 1st stage condition, the spools of the 1-2 shift valves V1 and the 3-4 shift valve V3 are slid to the upward position in FIGS. 1A and 1B by each spring because the solenoid valve S1 is open.

Therefore, the line pressure to the brake 83 is cut off by the 1-2 shift valve V1 and further the D-range pressure (passage L7) is introduced into the hydraulic passage LB2 of the brake 82 by way of the 1-2 shift valve, the passage L9, the 2-3 shift valve V2, the passage L10, the 3-4 shift valve V3, the passage L11 and the 5-6 shift valve V5, thus the 2nd stage condition being established on the basis of the engagement of the clutch C1 and the brake 82.

In the 3rd gear shift stage (3rd), only the solenoid valve S1 is ON and all the solenoid valves are open, so that the 2-3 shift valves V2 is slid to the upward position in FIGS. 1A and 1B as compared with the 2nd stage because the solenoid valve S3 is open.

Therefore, the 2-3 shift valve V2 changes over the D-range hydraulic pressure from the hydraulic passage L9 from the passage L10 to the passage L12 to cut off the D-range pressure to the brake 82 and further this D-range pressure is introduced into the passage for the brake 81 via the passages L12 and L16, the 3-4 shift valve V3, a passage L13, the 4-5 shift valve V4, a passage L14, and the 5-6 shift valve V5, thus the 3rd gear shift condition being established on the basis of the engagement of the clutch C1 and the brake 81.

In the 4th gear shift stage (4th), all the solenoid valves are turned OFF, therefore only the solenoid valve S1 is closed to slide the 3-4 shift valve in the downward direction in FIGS. 1A and 1B as compared with the 3rd stage. Further, although the line pressure is introduced into the hydraulic chamber V1a of the 1-2 shift valve V1 because the solenoid valve S1 is closed, since the D-range pressure introduced from a hydraulic passage L15 via the 2-3 shift valve V2 urges the spool in the upward direction in cooperation with the spring, the spool of the 1-2 shift valve V1 is still kept at the upward position in the Figure.

Therefore, the D-range pressure from the hydraulic passage L12 is changed over by the 3-4 shift valve V3 from the passage L13 into the hydraulic passage LC3 of the clutch C3 but cut off from the brake 81, thus the 4th gear shift condition being established on the basis of the engagement of the clutches C1 and C3.

In the case of the 5th gear shift stage (5th), only the solenoid valve S2 is turned ON, therefore the solenoid valves S1 and S2 are closed. Since the line pressure is introduced into the hydraulic chamber V4a of the 4-5 shift valve V4 via the inhibitor valve 7, its spool is slid in the downward direction in FIGS. 1A and 1B as compared with the 4th stage.

Therefore, the introduction of the D-range pressure from the hydraulic passage L8 to the passage LC1 of the clutch C1 is cut off by the 4-5 shift valve V4. Instead, the D-range pressure which has been communicating with the hydraulic passages L12 and L16, the 3-4 shift valve V3 and the passage L17 is introduced into the passage LB1 of the brake 81 via the 4-5 shift valve V4, the passage L14 and the 5-6 shift valve V5, thus the 5th gear shift condition being established on the basis of the emgagement of the clutch C3 and the brake 81.

In the case of the 6th gear shift stage (6th), the solenoid valves S2 and S3 are turned ON and therefore all the solenoid valves are closed. Since the solenoid valve S3 is closed, the line pressure is introduced into the hydraulic chamber V5a of the 5-6 shift valve V5, so that its spool is slid in the downward direction as compared with the 5th stage. Further, although the line pressure is introduced into the hydraulic chamber V2a of the 2-3 shift valve V2 due to closing of the solenoid valve S3, since the D-range pressure introduced from the hydraulic passage L7 by way of the 4-5 shift valve V4 and the passage L19 urges the spool of the 2-3 shift valve V2 in the upward direction in cooperation with the spring, the spool is still kept at the upward position in the drawing.

Therefore, the introduction of the D-range pressure from the passage L14 to the passage LB1 of the brake 81 is cut off by the 5-6 shift valve. Instead, the D-range pressure is introduced from the passage LC3 of the clutch C3 into the hydraulic passage LB2 of the brake B2 via a passage L20, the 4-5 shift valve V4, a passage L21 and the 5-6 shift valve V5, thus the 6th gear shift condition being established on the basis of the engagements of the clutch C3 and the brake 82.

The abovementioned hydraulic control circuit is used for the 6 forward gear shift stage transmission. However, when the 5-6 shift valve V5 is omitted, and the passage L14 and L81, the passages L11 and LB2 and the passages L20 and L21 are connected to each other, respectively, it is also possible to constitute a hydraulic control circuit for a 5 forward gear shift stage transmission on the basis of the operation of the solenoid valves in the same manner as in the abovementioned embodiment.

Further, in the above embodiment, it is disclosed that the solenoid valve S1 is of normally closed (NC) type and the solenoid valves S2 and S3 are of normally open (NO) type. However, the type of each of these solenoid valves is not limited thereto.

As described above, according to the first aspect of the present invention, since the hydraulic control circuit is so configured as to establish each gear shift stage in such a way that a single solenoid valve controls two shift valves and further, since the operation of each solenoid valve works in combination with one another, it is unnecessary to provide a solenoid valve for each shift valve, which is different from the conventional circuit. In automatic transmissions with 5 or more forward gear change ratio, in particular, it is possible to reduce the number of necessary solenoid valves and thus the cost of the transmission and further minimize the size of the transmission as compared with the conventional transmission. In addition, in case one solenoid valve suffers malfunction, since the double engagements of the friction members can be prevented based on the specific connection of the solenoids, it is possible to secure manual shift travelling.

Further, according to the second aspect of the present invention, since the manual-range pressure is supplied to each friction member via at least two shift valves at each gear shift stage in such a way that one shift valve serves to shift the stage and the other shift valve serves as a valve for switching hydraulic pressure supply to a friction member to which pressure is supplied from a plurality of passages, it is possible to eliminate the use of change balls in the automatic transmission with at least 5 forward gear change ratios, thus improving the durability and reliability of the transmission.

With respect to the third aspect of the present invention, the hydraulic chamber 7a of the inhibitor valve 7 is connected to the line hydraulic passage L1 via the solenoid valve S2 and further to the hydraulic chamber V4a of the 4-5 shift valve V4 via the passage L3. Further, this inhibitor valve 7 normally (due to S2=NO) communicates the passage L18 with the passage L22 to introduce the 3-range pressure from the manual valve 2 into the hydraulic chamber V4b of the 4-5 shift valve V4. Additionally, when the line pressure is not introduced into the hydraulic chamber 7a (=S2 is OFF), this inhibitor valve 7 communicates the passage L18 with the passage L23 to introduce the "3"-range pressure into the hydraulic chamber V3b of the 3-4 shift valve V3 and simultaneously communicates the passage L24 with the passage L25 to introduce the 2-range pressure into the hydraulic chamber V2b of the 2-3 shift valve V2.

The operations of the solenoid valves S1, S2 and S3 and the associated shift valves V1 to V5 and the engagements of the clutches and brakes in a manual "3"-range are the same as those in the 3rd stage as follows: the solenoid valve S1 is on; the solenoid valves S2 and S3 are off; that is, all the solenoid valves are kept open.

Here, in the case where all the solenoid valves suffer disconnection; that is, even when the solenoid valve S1 is turned off into closed condition, since the D-range pressure is introduced from the manual valve 2 to the hydraulic chamber V1b of the 1-2 shift valve via the passage L7, the 2-3 shift valve V2 and the passage L15, the spool of the 1-2 shift valve V1 is kept as it is at the upward position, and the 3-range pressure is introduced from the manual valve 2 into the hydraulic chamber V3b of the 3-4 shift valve V3 via the passage L18, the inhibitor valve 7, and the passage L23, so that the spool of the 3-4 shift valve V3 is kept at the upper position.

Therefore, even if the solenoid valve is disconnected, since no change in the spool position will be produced in each shift valve, the 3rd stage is kept unchanged, thus inhibitor being established against the solenoid disconnection.

Further, when manual shift-down is effected from "D" range to 3rd at high speed travelling, the solenoid valve S1 is so controlled as to be turned from ON to OFF and the solenoid valve S2 is so controlled from OFF to ON (, which is different from the "3rd" stage at "D" range). Therefore, the line pressure is introduced into the hydraulic chamber 7a of the inhibitor valve 7, and its spool is slid to the downward position in the Figure to cut off the 3-range pressure introduced from the passage L18 to the 3-4 shift valve V3, so that the spool of the 3-4 shift valve V3 is slid downward to maintain the 4th stage.

Therefore, when manual shift down is effected from "D" to manual-"3" at high speed travelling, as long as the solenoid valves S1 and S2 are controlled as described above, it is possible to maintain the 4th stage, thus the inhibitor being established at manual shift down.

In the conventional transmission, since the manual "3"-range pressure has been introduced directly into the hydraulic chamber V3b of the 3-4 shift valve V3, when the manual shift down is effected from "D" to "3", the gear change position is shifted down to the 3rd position forcively. Although the inhibitor at the solenoid disconnection can be established, it has been impossible to establish the inhibitor at manual shift down.

As described above, according to the third aspect of the present invention, since an inhibitor valve operative by any one of solenoid valves for controlling shift valves are connected to the hydraulic control circuit, it is possible to simultaneously establish the inhibitor for enabling manual shift-down drive in case of solenoid valve disconnection and the inhibitor for preventing engine over-run in case of manual shift down, thus ensuring safe automatic vehicle running.

In Table 3, modes of operation for the solenoid valves, shift valves and friction members (F/M) are summarized.

TABLE 3

| | Sol V. ON | engaged F/M | communication and valve position | cut for shift valve (F/M) |
|---|---|---|---|---|
| 1st | S3 | B3 C1 | 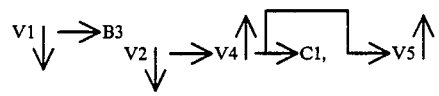 | — |
| 2nd | S1 S3 | B2 C1 | 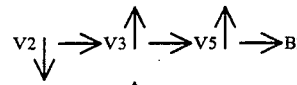 | V1↑ (B3) |
| 3rd | S1 | B1 C1 | 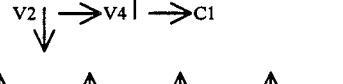 | V2↑ (B2) |
| 4th | none | C3 C1 | 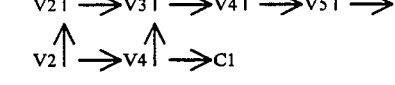 | V3↓ (B1) |
| 5th | S2 | C3 B1 | 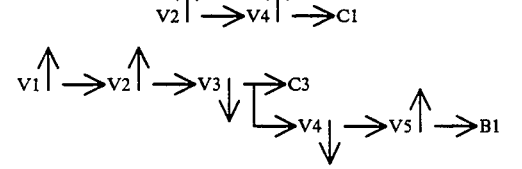 | V4↓ (C1) |

TABLE 3-continued

| Sol V. ON | engaged F/M | communication and valve position | cut for shift valve (F/M) |
|---|---|---|---|
| 6th S2 S3 | C3 B2 | V1↑→V2↑→V3↓→C3<br>V4↓  ↳→V4↓→V5↓→B2 | V5↓ (B1) |

F/M = friction member

Different embodiments of this invention may be made without departing from the gist of the entire disclosure and the scope of the following claims.

What is claimed is:

1. A hydraulic control circuit for an automatic transmission, said transmission having at least five forward gear shift stages, said hydraulic control circuit comprising: a manual range pressure means providing a manual range pressure; a plurality of friction members selectively engaged to provide said five forward gear shift stages; and a plurality of shift valves; wherein for each forward gear shift stage said manual range pressure is supplied to said friction members by means of at least two shift valves for each friction members selected.

2. The hydraulic control circuit as defined in claim 1, including four shift valves which establish five shift stages and at least two manual shift ranges.

3. The hydraulic control circuit as defined in claim 2, further including a fifth shift valve for establishing a sixth shift stage.

4. The hydraulic control circuit as defined in claim 3, wherein a manual shift range is established at a third shift stage by application of manual range pressure to one friction member by three of said four shift valves.

5. The hydraulic control circuit as defined in claim 4, wherein a further manual shift range is established at a second shift stage by application of manual range pressure to another friction member by one of said four shift valves and said fifth shift valve.

6. The hydraulic control circuit as defined in claim 2, wherein one of the manual shift ranges is established at a third shift stage of said five shift stages by application of manual range pressure to one friction member by at least two of said four shift valves.

* * * * *